United States Patent [19]

Fukuoka et al.

[11] Patent Number: 5,780,947
[45] Date of Patent: Jul. 14, 1998

[54] CORELESS MOTOR

[75] Inventors: Kodo Fukuoka, Tottori-ken; Kouji Kuyama, Yonago, both of Japan

[73] Assignee: Matsushita Electric Industrial Co., Ltd., Osaka-fu, Japan

[21] Appl. No.: 798,037

[22] Filed: Feb. 6, 1997

[30] Foreign Application Priority Data

Feb. 7, 1996 [JP] Japan ................. 8-021118

[51] Int. Cl.⁶ ................. H02K 5/04; H02K 7/08
[52] U.S. Cl. ................. 310/80; 310/42; 310/81; 310/40 MM; 310/89; 310/90; 310/154; 310/266
[58] Field of Search ................. 310/80, 81, 40 MM, 310/266, 90, 154, 89, 67 R, 42

[56] References Cited

U.S. PATENT DOCUMENTS

| | | | |
|---|---|---|---|
| 3,475,632 | 10/1969 | Moresi | 310/266 |
| 3,514,654 | 5/1970 | Moresi | 310/266 |
| 3,604,962 | 9/1971 | Larson | 310/67 |
| 4,327,304 | 4/1982 | Aoki | 310/266 |
| 4,337,568 | 7/1982 | Morisawa | 29/598 |
| 4,794,392 | 12/1988 | Selinko | 340/825.46 |
| 5,107,155 | 4/1992 | Yamaguchi | 310/81 |
| 5,270,602 | 12/1993 | Takehara | 310/198 |
| 5,347,187 | 9/1994 | Tsuzaki et al. | 310/40 MM |
| 5,621,260 | 4/1997 | Fukuoka et al. | 310/154 |

*Primary Examiner*—Steven L. Stephan
*Assistant Examiner*—Michael J. Wallace, Jr.
*Attorney, Agent, or Firm*—Wenderoth, Lind & Ponack, L.L.P.

[57] ABSTRACT

A coreless motor has a cylindrical shell of magnetic material, a column-like magnet securely and coaxially positioned in the shell to form a cylindrical clearance therebetween, and a rotor. The rotor includes a cylindrical winding of a coil, arranged coaxially in the clearance, a commutator mechanically supporting one end of the winding and electrically connected with the coil, and a shaft for supporting the commutator. The motor further includes a pair of brushes arranged in contact with the commutator, such that an electric current is supplied via the commutator to the coil. A first bearing is mounted at an end portion of the magnet adjacent the commutator to rotatably support a first portion of the shaft, and a second bearing is mounted adjacent one end of the shell to rotatably support a second portion of said shaft.

10 Claims, 4 Drawing Sheets

CORELESS MOTOR

FIELD OF THE INVENTION

The present invention relates to a coreless motor or iron-less motor. More specifically, the invention relates to a small-sized coreless motor preferably used with small-sized electric devices such as portable video-cameras. Further, the invention relates to a coreless motor which constitutes a major part of a source of vibration in a small-sized electric device such a pager.

BACKGROUND OF THE INVENTION

A recent tendency of rendering electric devices smaller and thinner in size for portable use has required the coreless motor to be further miniaturized and made more economical and reliable. Also, the pager, being small for better portability, needs a battery housed therein to be miniaturized. For these reasons, a small-sized and less power-consumptive coreless motor has been demanded up to the present.

FIG. 3 shows a conventional small-sized coreless motor 20. The coreless motor includes a rotor 21. Rotor 21 comprises an output shaft 22, a commutator 23 secured on shaft 22, and a winding 24 of coil formed into a cylinder which is arranged coaxially around shaft 22 and fixed at its one end to commutator 23. The coil is electrically connected at both ends to commutator 23 by suitable means such as soldering or spot welding. Shaft 22 is coaxially and rotatably supported in housing 25 by a pair of bearings 26 and 27 secured adjacent respective ends of housing 25, and thereby rotor 21 can rotate around cylindrical housing 25. Housing 25 carries on its outer surface a magnet 28 in the form of a cylinder. Rotor 21 and housing 25 are coaxially housed in a cylindrical shell 29. Also, one --end opening of shell 29 holds one end of cylindrical housing 25 while the other end opening thereof has therein a bracket 30, which eventually forms a magnetic circuit between magnet 28 and shell 29. Bracket 30 supports on its inner surface a pair of opposing brushes 31 so that the brushes 31 are in contact with commutator 23. Bracket 30 also receives one end of shaft 22 to prevent shaft 22 from moving in its longitudinal direction. With this coreless motor 20 thus constructed, an electric current is applied via brushes 31 and commutator 23 to the coil 24, causing rotor 21 to rotate in a specific direction.

FIGS. 4A and 4B show a vibrator generally indicated by reference numeral 32 in which the conventional coreless motor is used as a major part thereof. In this vibrator a weight 33 is eccentrically secured on the end of shaft 22 which is protruded from shell 29. Therefore, by energizing the motor, weight 33 rotates to generate centrifugal force and thereby periodic vibrations.

Although the coreless motor is preferable for use, additional improvements have been demanded in response to the requirements of miniaturization and higher performance of the electric devices.

Also, when using the coreless motor in the vibrator, applying a low current will lead to a significant loss of rotational energy because a relatively large centrifugal force is loaded on the bearing near the weight.

SUMMARY OF THE INVENTION

Accordingly, an object of the invention is to provide an improved small-sized coreless motor, capable of being miniaturized and driven with a decreased electric current, and which can be easily assembled.

To this end, a coreless motor of the invention includes a coreless motor having a cylindrical shell of magnetic material, a column-like (or columnar) magnet securely and coaxially positioned in the shell to form a cylindrical clearance therebetween, and a rotor. The rotor includes a cylindrical winding of a coil, arranged coaxially in the clearance, a commutator mechanically supporting one end of the winding and electrically connected with the coil, and a shaft positioned on an axis of the magnet for supporting the commutator. The motor further includes a pair of brushes arranged in contact with the commutator, such that an electric current is supplied via the commutator to the coil. A first bearing is mounted at an end portion of the magnet adjacent the commutator to rotatably support a first portion of the shaft, and a second bearing is mounted adjacent one end of the shell to rotatably support a second portion of the shaft.

Preferably, the coreless motor includes a ring of sintered-metal which is press-fitted between the shell and the magnet to fix the magnet for a ease of assembly.

More preferably, the sintered-metallic ring predominantly consists of copper to eliminate a magnetic influence which would otherwise be disadvantageous for positioning the magnet in the shell using a magnetizable ring.

The first portion of the shaft supported by the first bearing may be a first extremity portion thereof. Also, the second portion of the shaft supported by the second bearing is a second, i.e., opposite extremity portion thereof.

According to another aspect of the invention, the coreless motor includes a weight eccentrically supported by the shaft. The weight may be supported between the first and second bearings.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

PREFERRED EMBODIMENT OF THE INVENTION

Figure 1:
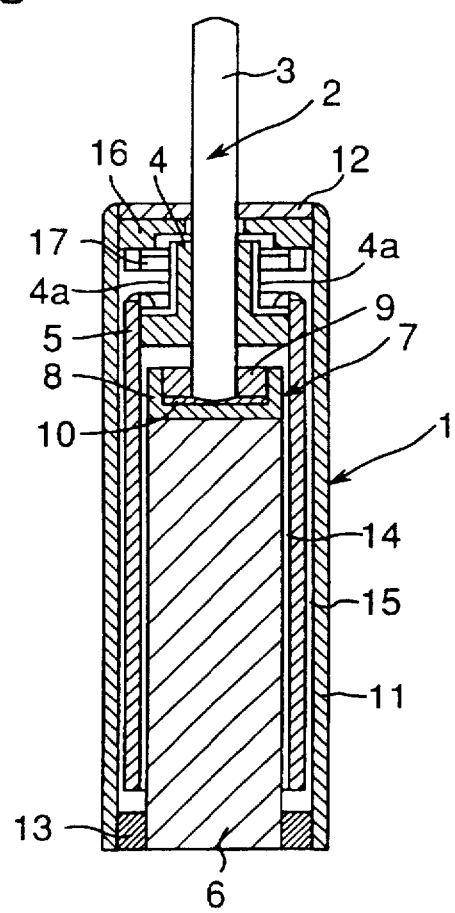
FIG. 1 is a sectional view of a coreless motor of a first embodiment of the invention.

Referring now to the drawings, and particularly to FIG. 1 thereof, there is shown an exemplary coreless motor of the invention generally indicated by reference numeral 1. Coreless motor 1 has a rotor 2. Rotor 2 comprises an output shaft 3. Shaft 3 carries a commutator 4 at its one side, i.e., lower side. Commutator 4, having a pair of opposing conductive segments 4a, supports an uppermost end of a winding 5 of the coil in the form of a cylinder. Also, both ends of the coil are electrically connected with associated segments 4a of commutator 4.

A magnet 6, being shaped in the form of a column, has a bearing assembly 7 at its uppermost end. Bearing assembly 7 includes a cup shaped bearing housing 8 fixed on the top end of magnet 6, a lower bearing 9 in the form of a ring secured in bearing housing 8 for receiving a lower periphery of shaft 3, and a thrust plate 10 interposed between bearing housing 8 and bearing 9 for receiving the lowermost end of shaft 3 thereby positioning shaft 3 on an axis of magnet 6. This magnet 6 is inserted in a winding 5 from its lowermost opening so that bearing 9 and thrust plate 10 support the lower end of shaft 3.

Rotor 2 and magnet 6 are positioned in place in a cylindrical shell 11, made of magnetic material, by an upper bearing 12 and a lower spacer ring 13. Upper bearing 12 is fixed at the uppermost opening of shell 11 so that it bears shaft 3 while spacer ring 13 is press-fitted between shell 11 and magnet 6. In this manner, thereby shell 11, winding 5, and magnet 6 are positioned coaxially with respect to each other while leaving respective cylindrical clearances 14 and 15 therebetween. Bearings 9 and 12 are preferably made of metal. Preferably, spacer ring 13 is to be a sintered metal ring manufactured through a powder metallurgy method through which a powder material containing copper is sintered into the ring.

Further, bearing 12 supports at its inner surface an annular bracket 16 which in turn carries a pair of opposing brush assemblies 17 so that they can contact with respective segments 4a of commutator 4 at opposite positions.

In operation of the coreless motor 1 thus constructed, an electric current is applied through brush assemblies 17 and commutator 4 to both ends of the coil of winding 5, thereby rotating rotor 2 and shaft 3.

As can be seen from the above description, the coreless motor employs the column-like (or columnar) magnet 6. This column-like magnet 6 can establish a more powerful magnetic field than a conventional cylindrical magnet having the same volume as column-like magnet 6, which allows the coreless motor of the invention to be further miniaturized and to have a greater output performance.

Further, column-like magnet 6 is secured in shell 11 by sintered-metallic ring 13 which is press-fitted therebetween, rendering the assembling of the two parts easier.

In addition, sintered-metallic ring 13 will lead to various advantages. Specifically, the sintered-metal is essentially porous or spongy. Therefore, the press-fitted ring 11 will hardly cause any excessive stress in shell 5. Also, generally the sintered-metallic product is manufactured by being molded with pressure in a die therefore, the ring can be precisely and economically manufactured, with the outer and inner peripheral surfaces being concentrically formed. Further, ring 13 is made of material mainly comprising copper. Therefore, magnet 6 can be positioned in place within shell 13 even when a magnetic means is used for its positioning, and further no mechanical positioning means is needed to position magnet 6, which allows the magnet to be inexpensive and lead to a simplification of an assembly device for the motor.

Figure 2A:
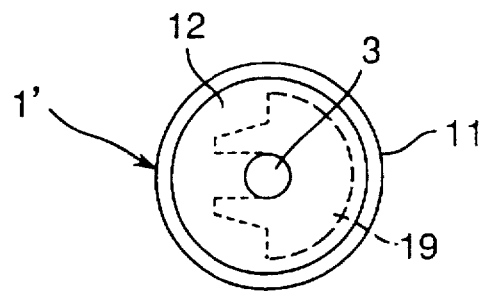
FIG. 2A is a top plan view of a coreless motor of a second embodiment to be used as a major part of a vibrator.
Figure 2B:
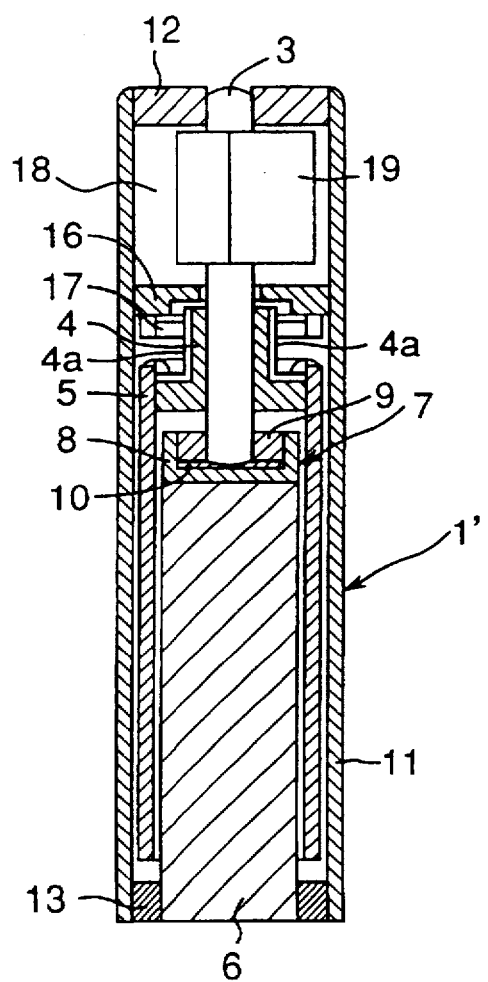
FIG. 2B is a sectional view of the coreless motor shown in FIG. 2A.
Figure 3:
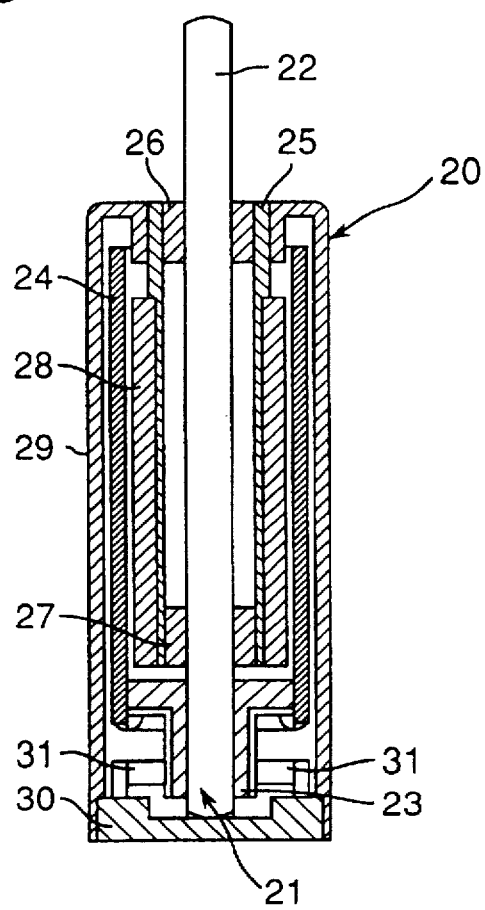
FIG. 3 is a sectional view of a conventional coreless motor.
Figure 4A:
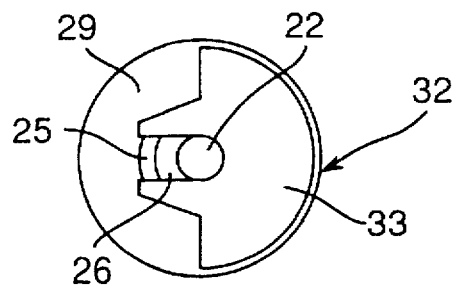
FIG. 4A is a sectional view of a vibration generator in which the conventional coreless motor is incorporated.
Figure 4B:
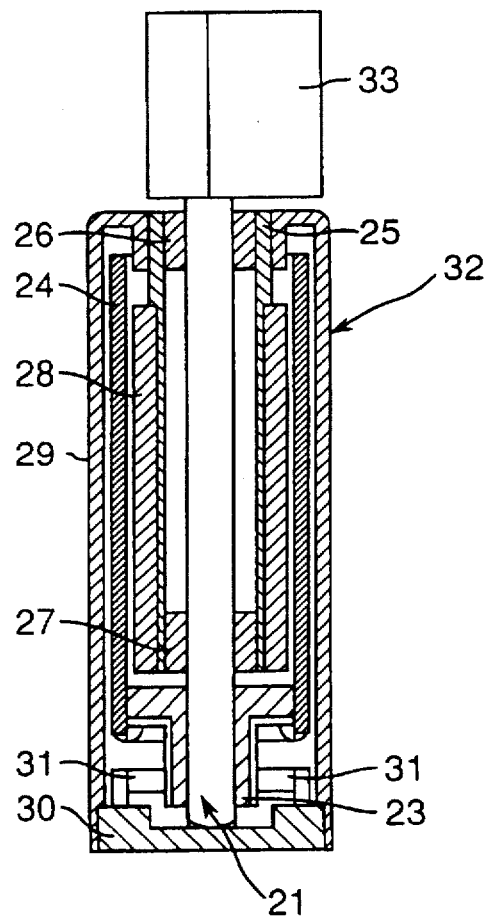
FIG. 4B is a sectional view of the vibration generator shown in FIG. 4A.

FIGS. 2A and 2B show another coreless motor, capable of constituting a major part of a vibration generator, generally indicated by reference numeral 1' in which bearing 12 is press-fitted in the top portion of shell 11 while leaving a sufficient space between the bearing 12 and bracket 16 so that a chamber 18 is formed therebetween. Also, a weight 19 is eccentrically secured on shaft 3 within chamber 18 in a suitable manner such as, for example, by pressing or bonding.

With this arrangement, shaft 3 having weight 19 is supported at both of its ends by fixed bearings 9 and 12, and therefore the centrifugal force generated due to the rotation of weight 19 is distributed to the two bearings 9 and 12. This decreases the loss of output energy as well as frictional wear of the bearings.

Although the fixing ring is first arranged around the magnet and then press-fitted in the shell along with the magnet in the previous embodiment, another manner of assembly can be employed in which the ring is secured in the ring and then the magnet is press-fitted in the ring.

As can be seen from the above description, the coreless motor of the present invention will provide various advantages.

That is, by employing a column-like magnet, a ratio of the magnet volume to the motor volume can be increased, which results in the miniaturization and higher output performance thereof.

Also, using the sintered-metallic ring and press-fitting it between the shell and the magnet will lead to easier assembly thereof.

Further, manufacturing the sintered-metallic ring with its material mainly comprising copper will not adversely influence the positioning when a magnetic force is used therefor. Besides, no mechanical positioning means is required for the magnet, allowing the magnet to be less expensive and leading a simplification of an assembly device for the motor.

Furthermore, arranging the weight in the shell and supporting it by the bearings securely positioned in the shell will lead to a reduction of energy loss at the bearings, a reduction of an electric current applied to the motor, and a higher rotational speed of the shaft.

What is claimed is:

1. A coreless motor, comprising:

a cylindrical shell of magnetic material;

a columnar magnet securely and coaxially positioned in said shell to form a cylindrical clearance between said magnet and said shell;

a rotor having a cylindrical winding of a coil, arranged coaxially in said clearance formed between said shell and said magnet, a commutator mechanically supporting one end of said winding and electrically connected with both ends of said coil, and a shaft positioned on an axis of said columnar magnet and supporting said commutator; and a pair of brushes arranged in contact with said commutator and through which an electric current is supplied via said commutator to said both ends of said coil;

a first bearing mounted at an end portion of said magnet adjacent said commutator and rotatably supporting a first portion of said shaft;

a second bearing mounted adjacent one end of said shell and rotatably supporting a second portion of said shaft; and a sintered-metal ring press-fitted between said shell and said magnet to fix said magnet in said shell.

2. A coreless motor claimed in claim 1, wherein said sintered-metal ring predominantly consists of copper.

3. A coreless motor claimed in claim 1, wherein said first portion of said shaft supported by said first bearing is a first end of said shaft.

4. A coreless motor claimed in claim 1, wherein said second portion of said shaft supported by said second bearing is a second end of said shaft opposite to a first end thereof.

5. A coreless motor claimed in claim 1, further comprising a weight eccentrically supported by said shaft.

6. A coreless motor claimed in claim 5, wherein said weight is supported by said shaft between said first and second bearings.

7. A coreless motor claimed in claim 3, wherein said second portion of said shaft supported by said second bearing is a second end of said shaft opposite to said first end thereof.

8. A coreless motor claimed in claim 1, wherein said first bearing is ring-shaped and is mounted in a cup-shaped bearing housing.

9. A coreless motor claimed in claim 8, wherein a thrust plate is mounted in said cup-shaped bearing housing adjacent said first bearing, and an end of said shaft bears axially against said thrust plate.

10. A coreless motor claimed in claim 1, further comprising an annular bracket interposed between said second bearing and said brushes, said brushes being supported by said bracket.

* * * * *